United States Patent [19]

Ho et al.

[11] Patent Number: 5,525,231

[45] Date of Patent: Jun. 11, 1996

[54] METHOD OF OPERATING A SEQUENCING BATCH REACTOR

[75] Inventors: Kin M. Ho, Kowloon, Hong Kong; Paul F. Greenfield; Kanthavanam Subramaniam, both of Indooroopilly, Australia; Jurg Keller, Taringa, Australia

[73] Assignee: CRC for Waste Management and Pollution Control Limited, New South Wales, Australia

[21] Appl. No.: 228,832

[22] Filed: Apr. 18, 1994

[30] Foreign Application Priority Data

Mar. 11, 1994 [AU] Australia .................. PM4355

[51] Int. Cl.$^6$ ............................................. C02F 3/02
[52] U.S. Cl. ..................... 210/620; 210/624; 210/631; 210/903
[58] Field of Search ................ 210/607, 609, 210/614, 617, 620–624, 626–631, 613, 610, 734–746, 903

[56] References Cited

U.S. PATENT DOCUMENTS

| | | | |
|---|---|---|---|
| 4,623,464 | 11/1986 | Ying et al. | 210/626 |
| 4,755,296 | 7/1988 | Ying et al. | 210/631 |
| 5,013,441 | 5/1991 | Goronszy | 210/621 |
| 5,021,161 | 6/1991 | Calltharp | 210/614 |
| 5,126,050 | 6/1992 | Irvine et al. | 210/621 |
| 5,185,079 | 2/1993 | Dague | 210/613 |
| 5,205,936 | 4/1993 | Topwick | 210/614 |

OTHER PUBLICATIONS

Chiesa, S. C., et al., "Feast/Famine growth environments and activated sludge population selection", Biotechnology and Bioengineering, vol. 27, (1985), pp. 562–569.

Goronszy, M. C., et al., "Biological phosphorus removal in a fed-batch reactor without anoxic mixing sequences", Journal of water pollution control federation, vol. 63(3), 1991, pp. 248–258.

Irvine, R. L., "An organic loading study of full–Scale sequecing batch reactors", Journal of water pollution control federation, (1985), vol. 57(8), pp. 847–853.

Ketchum, L. H., et al., "A comparison of biological and chemical phosphorus removals in contnuous sequencing batch reactors", Journal of water pollution control fed., vol. 59(1) pp. 13–18, 1987.

Manning, J. F., et al., "The biological removal of phosphorus in a sequencing batch reactor", Journal of water pollution control fed., vol., 57(1), pp. 87–94, 1985.

Nielsen, J. S., et al., "Operating experiences at a large continuously fed, intermittently decanted, activated sludge plant", Journal of water pollution control fed. vol. 60(2), pp. 199–205, 1988.

Domori, S., et al., "Treatment performance and design procedure of sequencing batch activated sludge process for municipal water treatment", Proceedings of the Australian Water. . . , pp. 359–363(1989).

Ho, K. M., et al., "Performance evaluation of variable volume intermittently operated biological nutrient removal activated sludge processes", Proceeding of the Australian water . . . , Apr. 1993, pp. 84–90.

Ho, K. M., "Small–scale intermittent cyclic biological nutrient removal (ICBNR) activated sludge processes incorporating non–mixing sequences", IAWQ specialized conference . . . , Norway, Jun. 1993.

Primary Examiner—Thomas G. Wyse
Attorney, Agent, or Firm—Loeb & Loeb

[57] ABSTRACT

A method of operating a sequencing batch reactor having a cycle consisting of FILL, REACT, SETTLE and DRAW periods and optionally an IDLE period, wherein supply of feed to the sequencing batch reactor comprises distributing the feed into settled sludge in the bottom part of the reactor. Also provided is a method of operating a sequencing batch reactor having the foregoing cycle, wherein the FILL and REACT periods include at least one non-mixed period.

13 Claims, 7 Drawing Sheets

METHOD OF OPERATING A SEQUENCING BATCH REACTOR

TECHNICAL FIELD

This invention relates to wastewater treatment and in particular to treatment of wastewater using sequencing batch reactors.

BACKGROUND ART

Meeting the increasingly stringent nitrogen (N) and phosphorous (P) effluent standards has had a major impact on the design and operation of wastewater treatment facilities dealing with domestic sewage with their typical unfavorable characteristics. Since the first success in achieving biological P removal in a continuous full-scale biological N removal plant in the 1970's, incorporation of biological P removal in a biological N removal plant is considered to be a generally achievable objective. Design and operation of biological nutrient removal (BNR) plants are now required to optimize these two parallel but interactive processes to maximize both nitrogen and phosphorus removal. Design and operation also requires simultaneous control of the associated sludge bulking problems resulting from the proliferation of filamentous bacteria.

The available BNR processes can be divided into continuously and intermittently operated systems. Continuously operated systems comprise a number of separate tanks or ponds through which wastewater and sludge is passed in various ways. Intermittently operated systems use a single reactor or pond, sometimes separated into zones by baffling, with only one pass of the wastewater through the reactor pond. Intermittent processes can therefore be characterized by their unique repeated sequencing time-oriented operation as compared to the space oriented operation of the continuous processes.

Intermittently operated systems can be either fed continuously or intermittently. They can be also subdivided into variable and constant volume systems. The variable volume systems accomplish solid-liquid separation in the same tank with subsequent withdrawal of the treated effluent (intermittent decant) while the constant volume intermittently operated facilities carry that out by a separate in-series secondary clarifier or basin with or without an underflow recycle returning the activated sludge back to the process.

In the operation of intermittently fed sequencing batch reactors (SBR) or sequencing batch ponds (subsequently called reactors) a substantial proportion of the cycle time is used for the fill period. During this time, the part of the reactor volume that was discharged at the end of the previous cycle, is replaced by fresh sewage before aeration commences. In BNR operation of these reactors, the fill period is of major importance for the removal of both nitrogen and phosphorus based nutrients. There are strong indications that good nutrient removal performance is dependant on the structure and composition of the biomass flocs in the reactors. Flocs should ideally be of similar size, compact, spherical and without filamentous growth. This encourages simultaneous nitrification-denitrification during aeration periods and ensures good sludge settling properties. Several advantages of simultaneous nitrification-denitrification have been reported in the past including reduced requirements for biodegradable carbon (or COD) in the raw wastewater, reduced aeration requirements and part or complete elimination of anoxic reactors or sequences if net nitrate production can be kept at low levels. Achieving simultaneous nitrification-denitrification is therefore regarded as beneficial both in continuous and intermittent systems.

Existing technology such as the cyclic activated sludge system (CASS) uses so called selectors or contactors which are small volumes in the inflow part of the reactor. In these zones the inflowing feed is mixed with the return activated sludge which is pumped from the reactor bottom or from specific clarifiers. This has two major drawbacks. Firstly, only part of the sludge mass is contacted with the inflowing feed and secondly, it requires mechanical pumping of the sludge. This second requirement is not only operationally difficult but is likely to have a negative effect on the structure of the sludge flocs due to the mechanical stress exerted during the pumping action.

SUMMARY OF THE INVENTION

It is an object of this invention to provide a method of operating a sequencing batch reactor which allows maintenance of favorable floc characteristics and contributes to improved performance of the reactor during periods following the fill period.

The present inventors have surprisingly found that the manner in which feed is supplied to a sequencing batch reactor can effect floc formation and hence reactor performance. In particular, the inventors have found that even distribution of feed into the settled sludge bed can improve reactor performance. This improvement is enhanced by including a non-mixed period into the FILL period of the reactor cycle. The inventors have further found that introducing non-mixed periods into both the FILL and REACT periods of a reactor cycle can also improve floc formation and reactor performance.

In one aspect, this invention provides a method of operating a sequencing batch reactor having a cycle consisting of FILL, REACT, SETTLE and DRAW periods and optionally an IDLE period, wherein supply of feed to the sequencing batch reactor comprises distributing the feed into settled sludge in the bottom part of the reactor.

In another aspect, this invention provides a method of operating a sequencing batch reactor having a cycle consisting of FILL, REACT, SETTLE and DRAW periods and optionally an IDLE period, wherein supply of feed to the sequencing batch reactor comprises distributing the feed into settled sludge in the bottom part of the reactor and wherein the FILL period includes at least one non-mixed period.

In yet another aspect, this invention provides a method of operating a sequencing batch reactor having a cycle consisting of FILL, REACT, SETTLE and DRAW periods and optionally an IDLE period, wherein supply of feed to the sequencing batch reactor comprises distributing the feed into settled sludge in the bottom part of the reactor and wherein the FILL and REACT periods each include at least one non-mixed period.

Typically, the FILL period includes one nonmixed period which comprises up to all of the FILL period. The FILL period can comprise up to about half of the sequencing batch reactor cycle.

Advantageously, the sequencing batch reactor cycle includes two non-mixed REACT periods.

In a still further aspect of the invention, there is provided a method of operating a sequencing batch reactor, wherein supply of feed to the sequencing batch reactor comprises distributing the feed into settled sludge in the lower part of the reactor and wherein the sequencing batch reactor cycle consists of the following reaction sequence: a non-mixed FILL period; a mixed FILL period; an aerated mixed REACT first period; a non-mixed REACT period; an aerated mixed REACT second period; a SETTLE period; and a DRAW period.

Other aspects of the invention will become apparent from the following detailed description.

DETAILED DESCRIPTION OF THE INVENTION

The following abbreviations are used herein:

| | |
|---|---|
| BASS | batch activated sludge system; |
| BNR | biological nutrient removal; |
| CASS | cyclic activated sludge system; |
| COD | chemical oxygen demand; |
| DO | dissolved oxygen; |
| F/M | food/microorganism ratio; |
| IFID | intermittently fed and decanted system; |
| IFID-2NS | intermittently fed and decanted system incorporating two non-mixed periods; |
| MLSS | mixed liquor suspended solids; |
| N | nitrogen; |
| NAS | non-agitated sequence; |
| $NH_4$-N | ammonium nitrogen; |
| $NO_2$-N | nitrite nitrogen; |
| $NO_3$-N | nitrate nitrogen; |
| $NO_x$-N | the sum of nitrite nitrogen and nitrate nitrogen; |
| OUR | oxygen uptake rate; |
| $PO_4$-P | phosphate phosphorous; |
| P | phosphorous; |
| RBCOD | readily biodegradable chemical oxygen demand; |
| SBR | sequencing batch reactor; |
| SCOD | soluble chemical oxygen demand; |
| So/Xo | ratio of the initial substrate concentration to the initial biomass concentration; |
| TCOD | total chemical oxygen demand; |
| TKN | total Kjedahl nitrogen; |
| TP | total phosphorous; |
| TSS | total suspended solids; |

The single-tank Batch Activated Sludge Systems (BASS) and the so-called sequencing batch reactors (SBR), require a non-agitated (non-mixed and non-aerated) SETTLE period to accomplish solid-liquid separation in the same tank with subsequent withdrawal of the treated effluent (intermittent decant), i.e. variable volume operation. During this non-agitated sequence (NAS), the biomass is allowed to concentrate at the bottom of the reactor and form a clear supernatant.

It is the extension of this special feature, which can be incorporated in an operating strategy not only for solid-liquid separation but more importantly for biosorption of the biodegradable organics and rapid environmental changes, which makes performance of the present reactor system superior to all conventional SBRs and continuous systems in terms of carbon, carbon and nitrogen, and carbon, nitrogen and phosphorus removal with positive sludge bulking control. This forms the basis of the present invention.

A typical SBR cycle is divided into five discrete time periods: FILL, REACT, SETTLE, DRAW and IDLE. With further combination of mixed or non-mixed and aerated or non-aerated operation, a total of 12 different reactions are possible.

The FILL period is the period of feed input into the reactor whereas the REACT period is a period of reaction without addition of fresh wastewater. In accordance with the invention, feed to the reactor during the FILL period is evenly distributed through the settled sludge blanket. In addition, a combination of various mixed or non-mixed and aerated or non-aerated periods can be introduced into the reactor cycle. The main possibilities will now be described.

1. Non-mixed, non-aerated FILL: This period enables intense contact between the sludge and the fresh sewage which has several beneficial effects on the reactor performance, particularly in conjunction with supply of feed directly into the settled sludge.

2. Mixed, non-aerated FILL: This period can be allocated in the second part of the fill cycle to achieve a mixing and degradation of remaining nitrates in the supernatant.

3. Mixed aerated REACT: After the fill period the mixing and aeration ensures rapid and complete phosphate uptake. This period can be extended to beginning of the settle period if good simultaneous nitrification/denitrification can be achieved and therefore only small amounts of nitrate accumulate in the reactor.

4. Non-mixed, non-aerated REACT: Short periods of low dissolved oxygen concentrations in between aerated periods ensure partial or complete uptake of nitrates by the denitrifying organisms. The benefit of the non-mixing is the fast change from aerobic to anoxic conditions within the sludge blanket compared to the completely mixed situation. This fast change enables more efficient denitrification and minimizes the risk of generating bulking sludges.

5. Mixed, non-aerated REACT: This period has a similar function as 4 but achieves more complete contact between the sludge and the wastewater due to the mechanical mixing. It can be used directly after the FILL period, in between aerated periods or directly before the settling period.

The variable combination of some or all of these different periods allows the adaptation of the process to wastewater of various compositions and concentrations. Based on on-line measurements of important components in the reactor different combinations for the treatment of the wastewater are feasible to achieve consistently good quality effluent.

An SBR cycle is typically within the range of 2 to 24 hours. Ideally, a cycle is less than 6 hours provided that reactor throughput is not compromised by the shorter cycle time. The following table sets out a preferred operating strategy in accordance with the invention and is based on a 6 hour cycle time.

TABLE I

Preferred Operating Strategy

| Reaction Sequence | Time (h) |
|---|---|
| 1. Nonmixed FILL | 1.25 |
| 2. Mixed FILL | 1.25 |
| 3. Aerated mixed REACT 1 | 1.00 |
| 4. Nonmixed REACT | 0.50 |
| 5. Aerated mixed REACT 2 | 1.50 |
| 6. SETTLE | 0.33 |
| 7. DRAW | 0.17 |
| 8. IDLE | 0.00 |
| TOTAL | 6.00 |

The most important non-mixing sequence in determining good process performance and sludge characteristics is the non-mixed FILL sequence. With an appropriate feeding pattern, interrelated chain reactions leading to excellent process performance with good sludge settling characteristics can be initiated. The subsequent non-mixed non-aerated REACT sequences further ensure that these chain reactions proceed in the required direction, especially for handling carbon-deficient/nutrient-rich wastewaters. In both cases, the concentrated biomass at the bottom of the reactor allows more rapid development of any required environmental conditions either from anoxic to anaerobic or from aerobic to anoxic.

In the non-mixed FILL sequence, the method according to an embodiment of the invention is to introduce and distribute the incoming wastewater through the settled sludge blanket allowing intimate contact between the concentrated biomass and the undiluted incoming wastewater. Generation of localized high So/Xo ratios and self-adjusting floc loading allows rapid biosorption by the floc-forming bacteria. The enmeshment of the slowly biodegradable particulate COD under anaerobic conditions further allows more RBCOD to be generated by fermentation and enhances biological phosphorus removal without incorporating any primary sludge prefermentor. This is particularly desirable as the RBCOD concentration of some domestic wastewaters is around 25 to 50 mg $L^{-1}$.

A second important environmental condition created by such a feeding pattern is the development of a high $NH_4$—N concentration. As the influent wastewater in the method of the invention is slowly fed to the reactor floor without generating any significant mechanical mixing, the treated effluent in the sludge blanket from the previous cycle is gradually replaced by the influent wastewater. Furthermore, it was found that the level of biodegradable carbon required for the denitrification process can be substantially reduced by use of the innovative feeding and operational strategy presented in this invention. A ratio of TCOD:TKN below the commonly reported minimal value of 7 for the influent wastewater was found to be suitable in this situation to achieve a high degree of nitrogen removal. As the TCOD:TKN ratio of some domestic wastewaters is very often <10 and frequently <7, this substantial saving in carbon source provides high potential in achieving future increasingly stringent effluent standards without any external addition of carbon.

Furthermore, in a single-tank system, i.e. without recycle, maintaining low effluent $NO_3$—N concentration in BASS relies on simultaneous nitrification-denitrification during the aerated sequence. This process is believed to depend on the formation of an anoxic fraction within the flocs which relies not only on the bulk DO concentration (0.5 to 3 mg $L^{-1}$), but more importantly on the floc characteristics.

The activity of the biomass in terms of the OUR or maximum specific growth rate and the floc diameter can be controlled by introducing the above-mentioned innovative feeding pattern during the non-mixed FILL with subsequent endogenous anaerobic sludge stabilization resulting from achieving good simultaneous nitrification-denitrification. By imposing such alternating feast and famine environments, bacteria in the activated sludge culture capable of rapid enzymatic transport of soluble organic substrates under exogenous anaerobic conditions, and synchronous multiplication in the presence of molecular oxygen, will be selected. This leads to a high OUR and full restoration of the biosorptive capacity in the endogenous aerobic and anaerobic periods. Filaments which are slower substrate accumulating and incapable of denitrifying and polyp accumulating will be eliminated. Fast growing, starvation-susceptible filamentous organisms will also be removed during the extended period of endogenous metabolism. This mode of operation ensures a high OUR especially at the beginning of the aerobic period and good settling biological flocs of optimal size to facilitate simultaneous nitrification-denitrification of the wastewater. Consequently, simultaneous nitrification-denitrification is enhanced. The resulting pH gradient due to nitrification and rapid uptake of phosphate further enhance simultaneous nitrification-denitrification even at higher DO concentration.

With successful simultaneous nitrificationde-denitrification, the reaction conditions required to achieve biological nitrogen and phosphorus removal change from anaerobic/anoxic/aerobic as in continuous BNR systems to anaerobic/aerobic only. This eliminates the presently unavoidable and uncontrollable sludge bulking problems due to alternating anoxic-aerobic conditions and the adverse effects on biological phosphorus removal caused by the carbon deficiency associated with incomplete denitrification.

It is believed that one of the major advantages the filamentous bacteria can have over the floc-forming bacteria is the way of growth of the former in the mixed liquor. The filamentous bacteria grow in profusion beyond the confines of the floc into the bulk medium bridging between flocs or completely in high abundance in the bulk solution. Consequently, they compete well with the floc-forming bacteria in completely mixed systems by having a larger surface area and lower substrate affinity. However, this privilege is no longer available if the feed is directed to the well thickened sludge after a prolonged SETTLE period which is normally not available in continuous clarifier systems. Another possible explanation of their way of growth is that the environmental conditions inside the floc are unfavorable. Consequently, they tend to extend their structure from the floc particularly to interfere with compaction during settling. Forcing them back to the floc during the SETTLE and non-mixed FILL period substantially reduces their chance of competing with the floc-formers.

The major benefit of this feed system into the reactors, is the intensive contacting of all biomass with the fresh feed stream entering the reactor. A large part of the water in the reactor from the previous cycle is in the supernatant and therefore not in contact with the sludge. This is advantageous since the supernatant water often contains nitrates which can be detrimental to the performance of the phosphorous removal processes.

This contacting period also provides a high food/microorganism ratio (F/M) which is beneficial for the growth of desirable floc-forming bacteria. Moreover, the presence of readily biodegradable chemical oxygen demand (RBCOD) favors the accumulation of internal carbon sources in the phosphorous removing bacteria. This stored carbon is then used in the phosphate uptake process during the aeration period and therefore facilitates the phosphorous removal process.

A major advantage of the present system is that the whole treatment process can be done in one single vessel. The auxilary equipment needed is also minimal since only feed and possibly a draw pump (and decanting weir), air blower and a mechanical mixer are needed to operate the reactors. In a minimal configuration, outflow (draw) can be achieved by a simple overflow mechanism and mechanical mixing might not be necessary in all cases.

Compared to existing continuous and intermittent BNR plants this design offers substantially reduced capital costs, simple operation and, based on the results obtained to date, excellent treatment performance in regards to COD, total N and total P. Experiments also show that it can handle very high strength wastewater (N and P) which is common in industrial treatment systems.

Although similar non-mixed fill sequences have been used in sequencing batch reactor cycles prior to this invention, the objectives of the use were different and the substantial benefits offered by such a simple modification were ignored. Chiesa et al (*Biotechnology and Bioengineering* 27, 562–569, 1985) carried out benchscale studies using the non-mixed FILL sequence to generate substrate gradient for their feast/famine population selection in sludge bulking control. In the experiments conducted by Manning and Irvine (*Journal of Water Pollution Control Federation,* 59(1), 13–18, 1985), the non-mixed FILL sequence was incorporated in the control system to minimize the contact between the biomass and the organic substrates while a mixed dump-FILL sequence was used to develop phosphorus removal sludge. The non-mixed FILL sequence was also trialed by Oomori et al (*Proceedings of the Australian Water and Wastewater Association* 13*th Federal Convention*, pp. 359–363, 1989) as an operating strategy in their pilot studies. Full-scale operation using this reaction sequence included Irvine et al. (*Journal of Water Pollution Control Federation,* 57(8), 847–853, 1985); Ketchum et al. (*Journal of Water Pollution Control Federation,* 59(1), 13–18, 1987) and Nielson and Thompson (*Journal of Water Pollution Control Federation* 60(2), 199–205, 1988). However, none of the prior art describes or hints at supply of feed to the reactor by direct and even distribution to the settled sludge blanket during the non-mixed FILL sequence.

So that the invention may be better understood, non-limiting examples follow.

EXAMPLE 1

Figure 1:
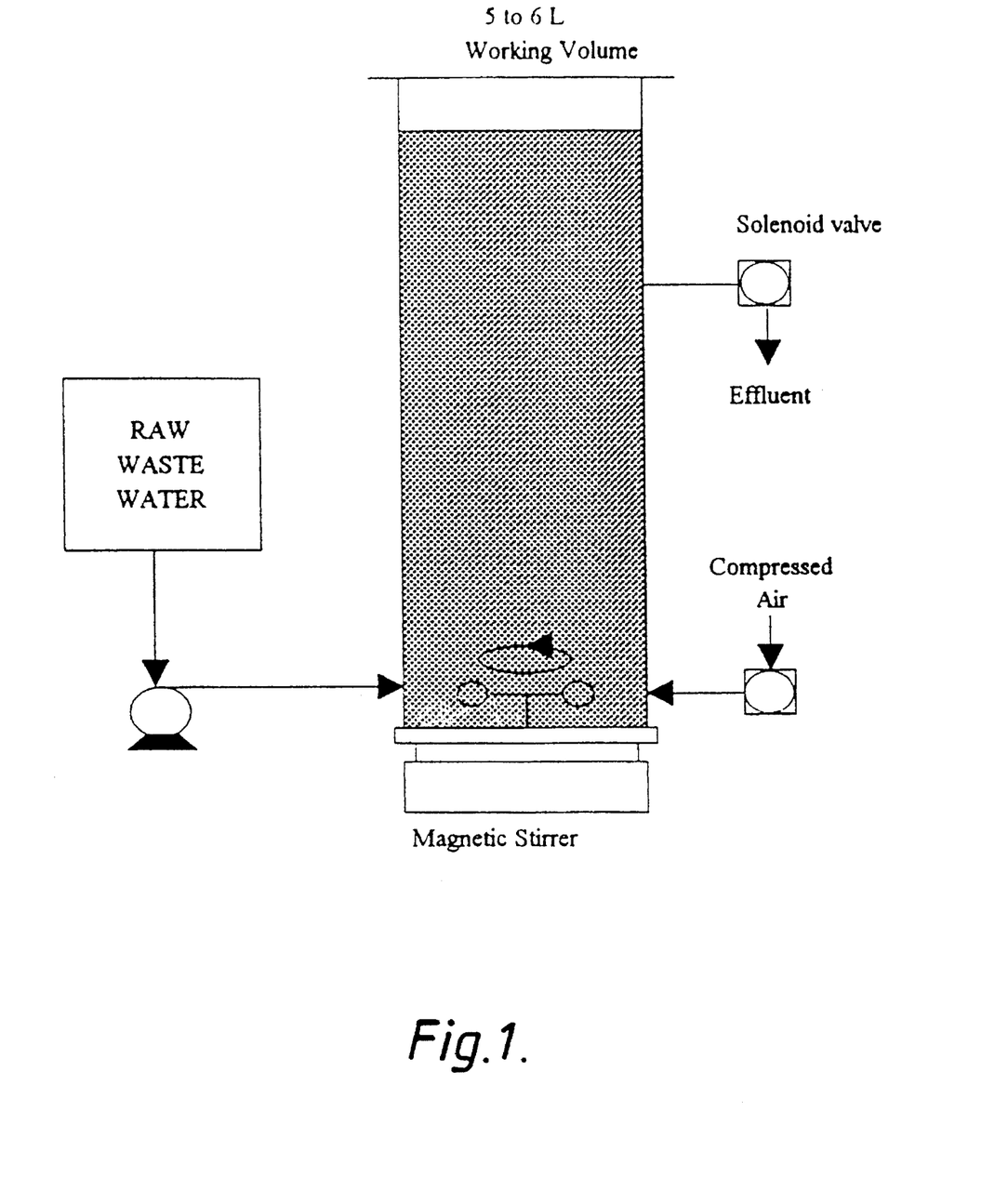
FIG. 1 is a representation of the system used for laboratory scale evaluation of the method according to the invention.

In this example, the performance of P and N removal and sludge settleability of a variable volume intermittently fed and decanted system incorporating two non-mixing sequences (IFID-2NS) was investigated. The IFID-2NS process was seeded with a freshly collected sample of mixed liquor from the Wacol Sewage Treatment Plant, Brisbane, Australia. The volume of the process was 4.5 L and the process was run using 18 hours hydraulic retention time and 20 days sludge age in a temperature controlled room maintained between 15°–20° C. The duration of the experiment was 53 days. The physical aspects of the process and the operating strategy are shown in FIG. 1 and Table I, respectively.

Grab samples of Wacol raw wastewater were collected once every 5 to 7 days and were stored at 4° C. Suspended solids in the wastewater were separated by gravity sedimentation and transferred to a 5 L batch prefermentor for VFA production, before being mixed with the settled wastewater. The feed drums were filled up twice a day. Mixing was provided to keep all solids in suspension. Influent wastewater from the feed drum was intermittently fed to the system at a rate of 600 mL h$^{-1}$, by a variable-speed Masterflex pump. An on-line filter was required to prevent any large solids from blocking the silicon tubing around the pump heads. The filter was cleaned twice a day to prevent solids accumulation. Effluent discharge was by gravity. Mixing was provided by either magnetic stirrer or industrial nitrogen bubbling. Diffuser stones were used to distribute air or nitrogen gas to the reactor. Excess activated sludge wasting was performed manually everyday to maintain the sludge age. All operations (i.e. fill, aeration, mixing and effluent discharge) were controlled by an IBM compatible computer.

Daily influent and effluent samples, 12 h and 6 h composite samples respectively, were collected. They were then manually composited using an equal volume of daily composite samples to give 5 to 7 day composite samples. Analyses of $PO_4$—P, $NO_3$—N and $SO_4$ on daily composite samples and total suspended solids (TSS), soluble and total COD (SCOD and TCOD), total P (TP), MLSS, TKN and $NH_3$—N on the manually composite samples were carried out to give the respective nutrient removals and hence the performance of the system. In-reactor soluble nutrient concentrations of each batch of wastewater samples were measured to indicate if the treatment performed satisfactorily after stable operation was noted. Samples for determining soluble parameters were filtered through a 0.45 µm membrane. COD concentration was measured by a COD analyser manufactured by HACH. $NO_3$—N, $PO_4$—P, and $SO_4$ concentrations were measured by ion chromatography. Sludge volume index (SVI) was measured using a 250 mL graduated measuring cylinder on the basis of a 30-minute settling period. All other analyses were carried out after "Standard Methods for the Examination of Water and Wastewater" (APHA, 1985).

The average influent characteristics during the 53 day period of the experiment are shown in Table II. The process performance of the IFID-2NS process, as expressed by the average effluent characteristics and the daily effluent $NO_3$—N, and $PO_4$—P concentration, is presented in Table II and FIG. 2 respectively. The biological nutrient removal mechanism in achieving the final effluent nutrient concentration on Day 47 is illustrated in FIG. 3. The influent characteristics on Day 47 are also shown in Table II.

TABLE II

| | Influent and effluent characteristics | | |
|---|---|---|---|
| | Influent | | |
| | Average | Day 47 | Effluent (Average) |
| TKN (mg L$^{-1}$) | 58.1 | 57.0 | 10.1 |
| NH$_4$-N (mg L$^{-1}$) | 48.6 | 45.0 | 8.8 |
| NO$_3$-N (mg L$^{-1}$) | 0.0 | 0.0 | 1.7 |
| TP (mg L$^{-1}$) | 8.8 | 10.0 | 0.8 |
| PO$_4$-P (mg L$^{-1}$) | 7.4 | 7.3 | 0.3 |
| SCOD (mg L$^{-1}$) | 153 | 131 | N/A |
| TCOD (mg L$^{-1}$) | 276 | 225 | 26 |
| TSS (mg L$^{-1}$) | 94 | 99 | N/A |
| TCOD:TKN | 4.7 | 3.9 | N/A |
| SCOD:TP | 17.3 | 13.2 | N/A |

Figure 2:
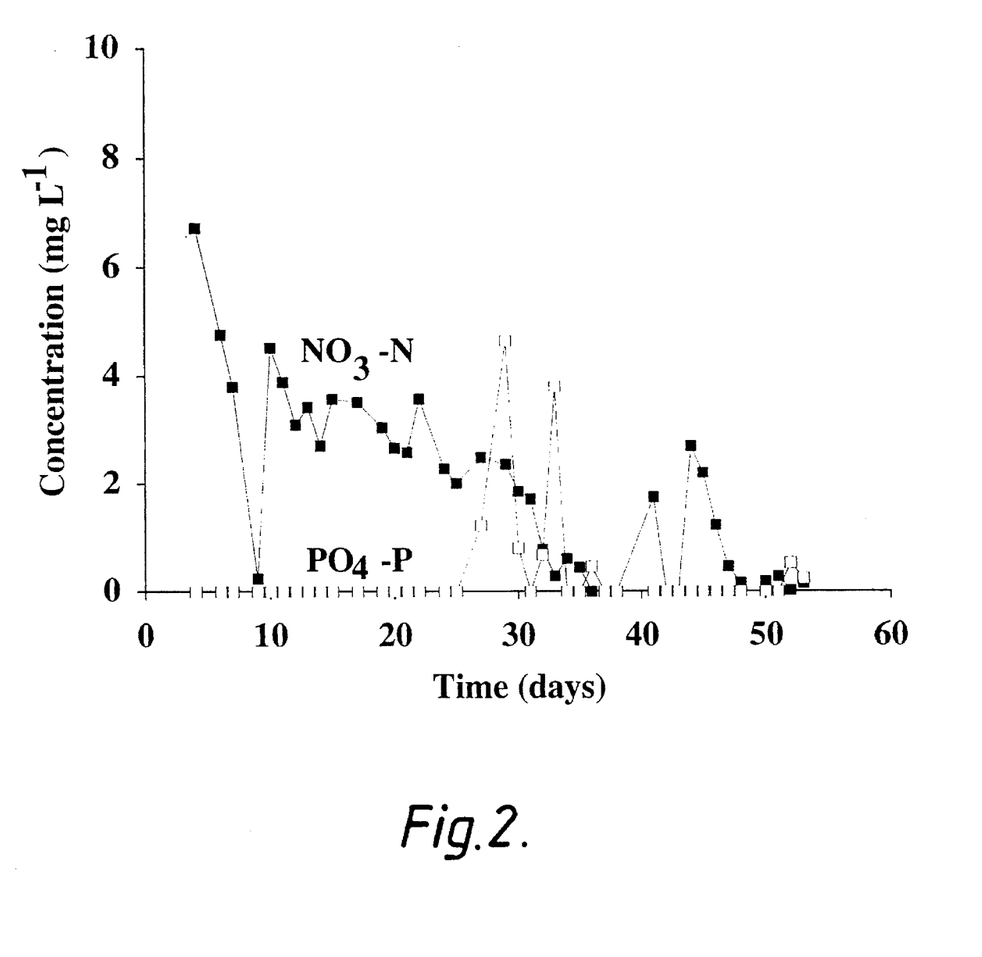
FIG. 2 depicts the daily effluent nutrient concentrations for the IFID-2NS system of Example 1.
Figure 3:
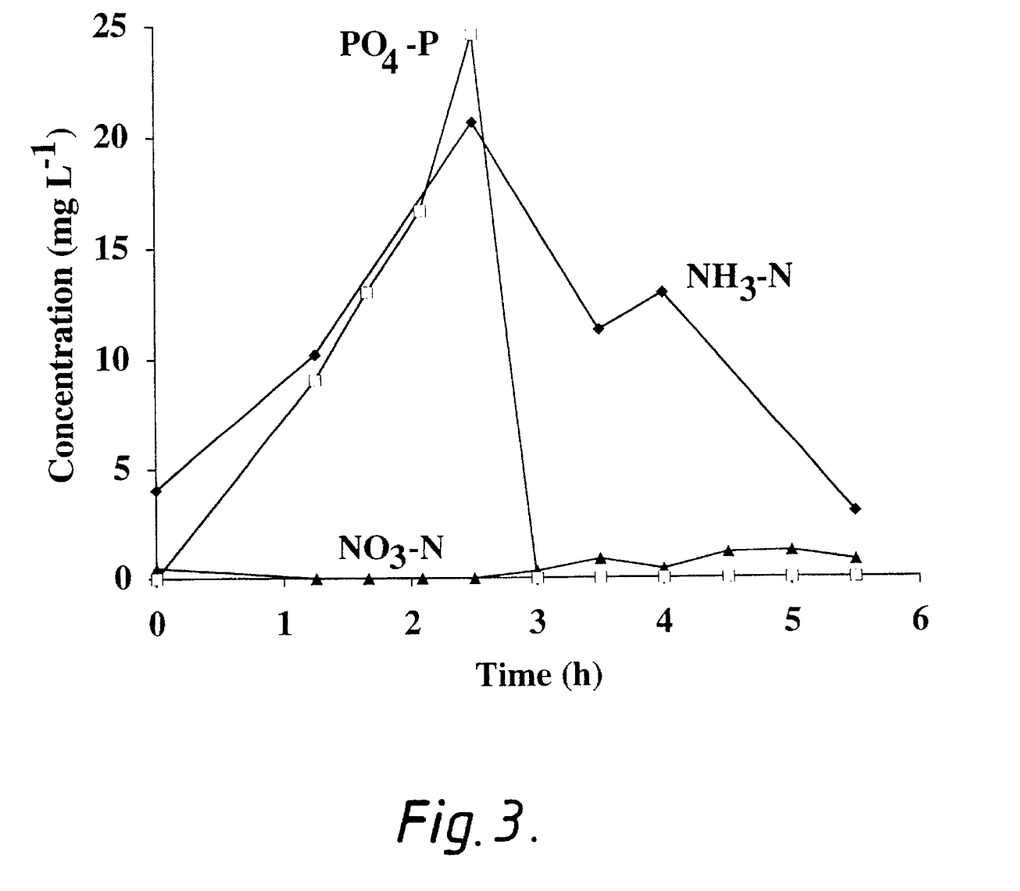
FIG. 3 depicts the nutrient concentration profile over one cycle of the IFID-2NS system of Example 1.

The IFID-2NS process produced an effluent of high quality despite the very low TCOD:TKN ratio (Table II and FIG. 2). An effluent $PO_4$—P concentration of <0.5 mg L$^{-1}$ was achieved most of the time. With the generation of a high $S_o/X_o$ ratio by incorporating a non-mixed FILL sequence at the beginning of a cycle, simultaneous nitrification-denitrification was always recorded with the in-reactor $NO_3$—N concentration being less than 5 mg L$^{-1}$ during the entire air-on sequences (FIG. 3).

The sludge blanket $NO_3$—N concentration at the end of a cycle was always low which greatly enhanced anaerobic RBCOD uptake and P release. The highest $PO_4$—P in the sludge blanket recorded was 46 mg $L^{-1}$. $PO_4$—P uptake in the presence of DO was rapid and not affected by temperature. Complete elimination of $PO_4$—P was achieved within the first hour of the aeration period with the value remaining low during the rest of the cycle (FIG. 3).

In addition, the IFID-2NS process generated a sludge with good settling behavior. The low nitrate concentration resulting from simultaneous nitrification-denitrification enables endogenous anaerobic sludge stabilization. Together with the introduction of a high $S_o/X_o$ ratio at the beginning of each cycle, synchronized division of microorganisms resulted which further ensured the selection of floc-forming bacteria. Consequently, the SVI was lower than 120 mL $g^{-1}$ most of the time despite the high non-aerated mass fraction (approx. 60%).

Example 2

In this example, the ability of the method of the invention to improve reactor performance is demonstrated.

The IFID system used was essentially the same, except for sequence periods, as that described in Example 1. Operating parameters are set out in Table III and influent characteristics are indicated in Table IV.

TABLE III

| | Reactor Sequence Periods | | |
| --- | --- | --- | --- |
| | Period (hours) | | |
| Sequence | Days 1–38 | Days 39–60 | Days 61–109 |
| Non-mixed FILL | 0.25 | 0.25 | 1.25 |
| Mixed FILL | 2.25 | 2.25 | 1.25 |
| Aerated mixed FILL | 0.50 | 0 | 0 |
| Aerated mixed REACT 1 | 2.50 | 3.00 | 1.00 |
| Mixed REACT | 0 | 0 | 0.50 |
| Non-mixed REACT | 0 | 0 | 0 |
| Aerated mixed REACT 2 | 0 | 0 | 1.50 |
| SETTLE | 0.33 | 0.33 | 0.33 |
| DRAW | 0.17 | 0.17 | 0.17 |
| TOTAL | 6.00 | 6.00 | 6.00 |

TABLE IV

| | Daily influent characteristics | | | |
| --- | --- | --- | --- | --- |
| | Day | | | |
| Characteristic | 36 | 58 | 59 | 103 |
| $NH_3$-N (mg $L^{-1}$) | 45.1 | 48.4 | 47.3 | 45.2 |
| TKN (mg $L^{-1}$) | 52.5 | 61.2 | 62.9 | 57.2 |
| $PO_4$-P (mg $L^{-1}$) | 6.9 | 8.0 | 8.9 | 7.3 |
| TP (mg $L^{-1}$) | 7.3 | 8.7 | 8.5 | 9.9 |
| SCOD (mg $L^{-1}$) | 184 | 205 | 210 | 131 |
| TCOD (mg $L^{-1}$) | 253 | 288 | 305 | 225 |
| TSS (mg $L^{-1}$) | 46 | 70 | 68 | 99 |
| TCOD:TKN | 4.8 | 4.7 | 4.8 | 3.9 |
| SCOD:TP | 25.0 | 23.6 | 24.6 | 13.2 |

Figure 4:
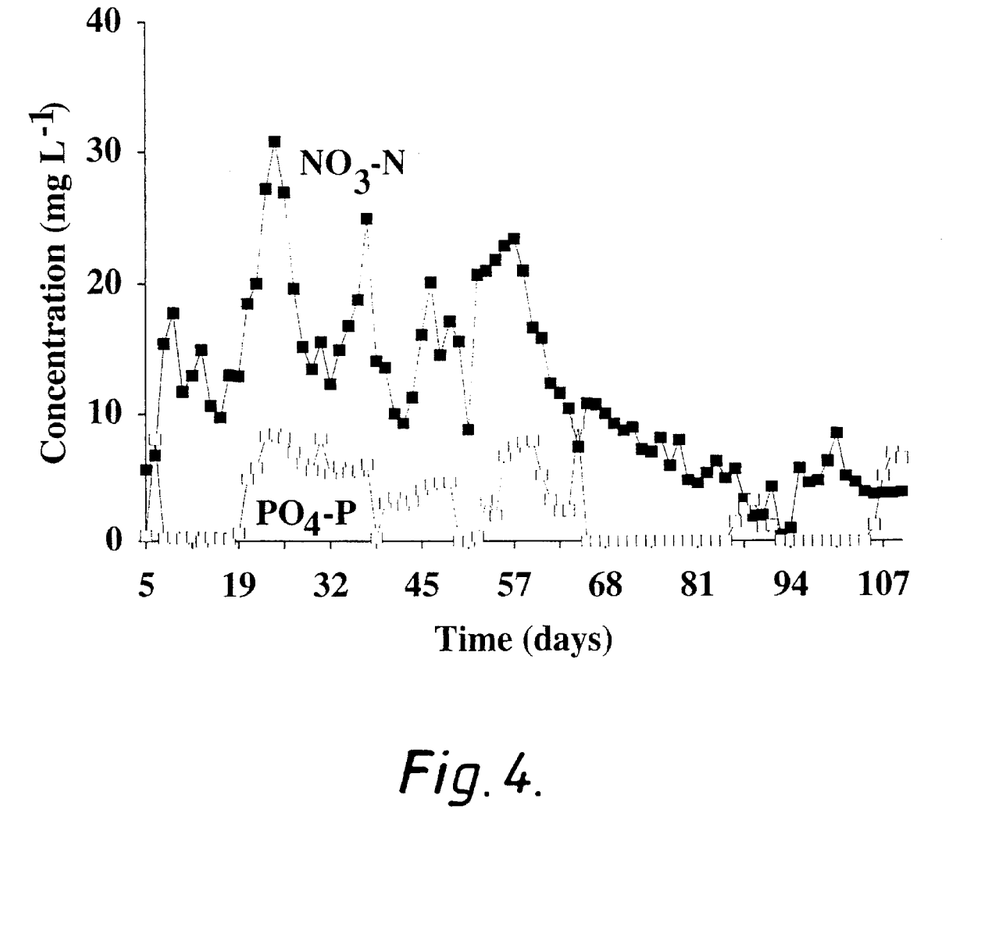
FIG. 4 presents daily effluent characteristics of the IFID system of Example 2.

As indicated in Table IV, the TCOD:TKN ratios were lower than those recommended by the Water Research Commission (1984). Only when TCOD:TKN ratios were much higher than 6 during the first 20 days of the experiment were effluent $NO_3$—N and $PO_4$—P levels low—see FIG. 4 which presents daily effluent characteristics. Consequently, at day 39 the feeding pattern was changed to maximize the organic substrates for nutrient removal by eliminating the aerated mixed FILL period. A marked improvement in reactor performance was immediately observed (see FIG. 4).

Prior to day 43, the batchwise average influent TCOD concentration was typically greater than about 300 mg $L^{-1}$. After day 43, this value fell to 221 mg $L^{-1}$. This sudden decrease in influent TCOD concentration resulted in the breakdown of the selective growth pressures in the reactor. Completely mixed reactor behavior resulted which led to an immediate increase in SVI and gradually produced uncontrollable sludge bulking problems. A SVI value and settled sludge volume as high as 393 ml/g and 70% respectively, were recorded. A fraction of sludge was lost during decanting. Biological P removal also collapsed. The non-aerated mass fraction was close to 60% which will lead to unavoidable high SVI values in continuous biological nutrient removal processes.

On day 60, a longer nonmixed FILL period was incorporated in the operating strategy to control the sludge bulking problem. A second air-off sequence was also included. The SVI values of the reactor dropped substantially from 393 to 228 ml/g in 5 days and from 228 to 153 ml/g in the following 15 days (data not shown). A remarkable improvement in nutrient removal was also noted as soon as simultaneous nitrification-denitrification during the air-on sequences was achieved (see FIG. 4). This clearly demonstrates the importance of incorporating a nonmixed FILL sequence in both nutrient removal and sludge bulking control. The consequence of the resulting high OUR and large floc diameter on the extent of simultaneous nitrification-denitrification was also obvious.

Figure 5A:
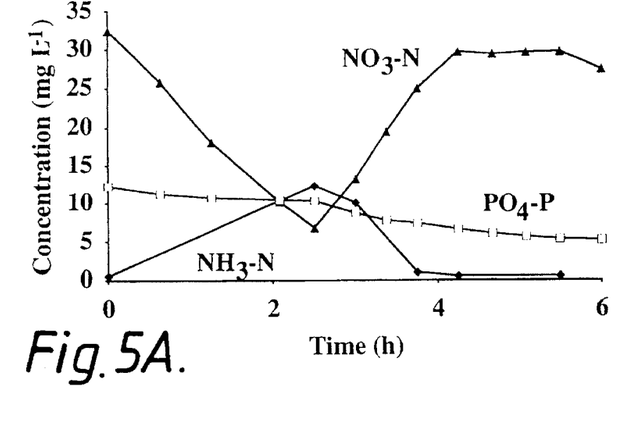
FIG. 5 presents nutrient concentration profiles of the IFID system of Example 2 on day 36 (FIG. 5a), day 59 (FIG. 5b) and day 103 (FIG. 5c).
Figure 5B:
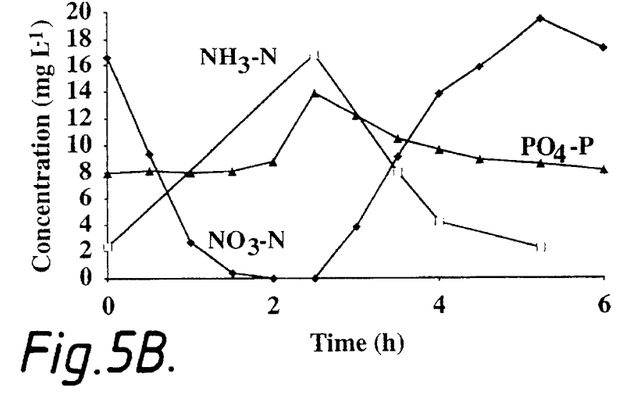
Figure 5C:
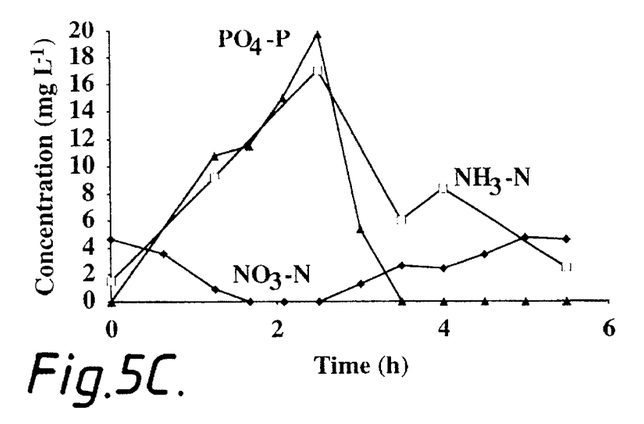

Nutrient concentrations throughout the reactor cycle are presented for days 36, 59 and 103 in FIGS. 5a to 5c respectively. It is noteworthy that biological N removal via simultaneous nitrification-denitrification requires less TCOD than that when nitrification and denitrification occur in separate reactors. As shown in Table IV and FIG. 5c, effluent $PO_4$—P and $NO_3$—N concentrations of <0.5 and 4.62 mg $L^{-1}$ respectively, were produced although the TCOD:TKN ratio was less than 4. It has been suggested that nitrogen might be removed in a different pathway either via nitritation-denitritation (oxidation of $NH_3$—N to $NO_2$—N followed by reduction of $NO_2$—N) resulting in up to 40% saving in organic energy or via aerobic denitrification.

EXAMPLE 3

In this example, the method of the invention was applied to abattoir (slaughter house) wastewater high in both nutrients and carbon. The feed used in this laboratory-scale study was effluent from an anaerobic pond of an abattoir wastewater system.

The SBR was operated at room temperature (20±2° C.) with an hydraulic retention time and solids retention time of 1.5 days and 20 days respectively. The reactor was seeded with sludge from a nitrogen removing domestic sewage treatment plant. The reactor sequence periods are set out in Table V. Other experimental conditions and procedures used were as set out in the previous examples.

TABLE V

| Sequence | Period (hours) |
|---|---|
| Reactor Sequence Periods | |
| Non-mixed FILL | 2.5 |
| Mixed, aerated REACT | 3.0 |
| SETTLE | 0.33 |
| DRAW | 0.17 |
| TOTAL | 6.0 |

Characteristics of the grab samples collected from the abattoir wastewater system varied considerably over the sampling period of 5 months. The ranges of the main variable are given in Table VI.

TABLE VI

| Characteristic | Range |
|---|---|
| Characteristics of influent waterwater | |
| COD (mg $L^{-1}$) | 3,500–6,000 |
| TKN (mg $L^{-1}$) | 180–250 |
| Sol $PO_4$-P (mg $L^{-1}$) | 30–50 |

Figure 6:
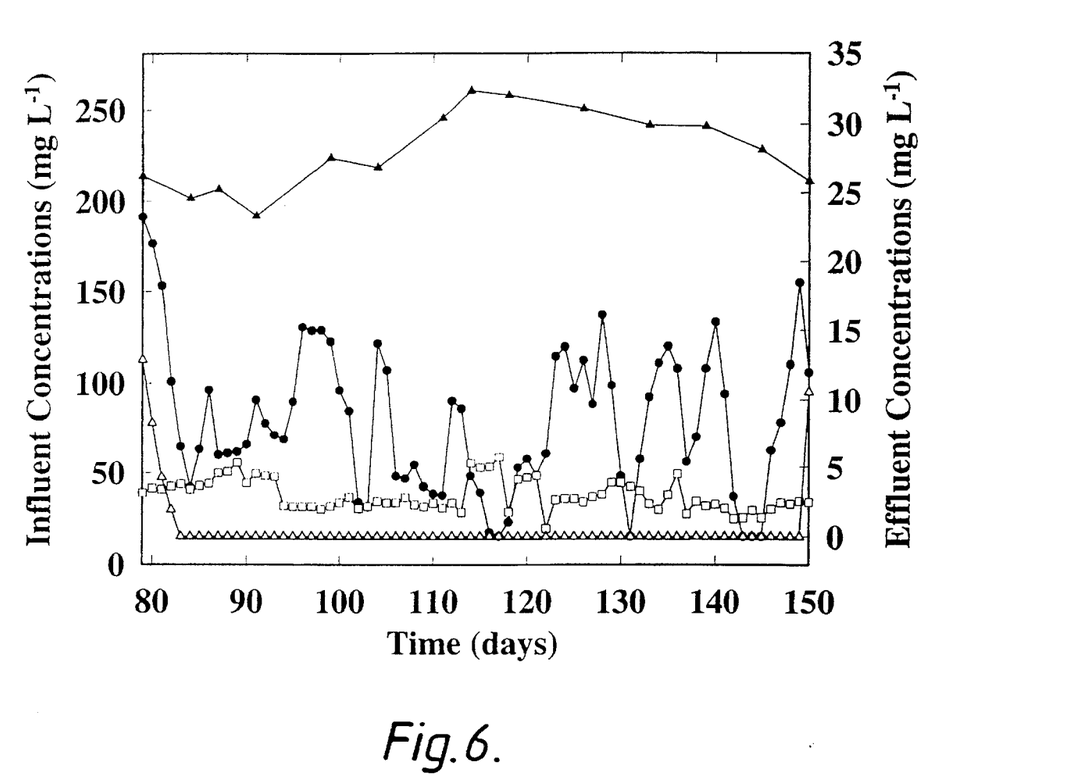
FIG. 6 depicts influent and effluent characteristics for the IFID system of Example 3.

The performance of the reactor, as determined from the daily influent TKN and $PO_4$—P, and effluent $NO_x$—N and $PO_4$—P, is presented in FIG. 6. In FIG. 6, the symbols (□), (▲), (●), (△) are used to indicate influent $PO_4$—P, influent TKN, effluent $NO_x$—N and effluent $PO_4$—P respectively.

Figure 7:
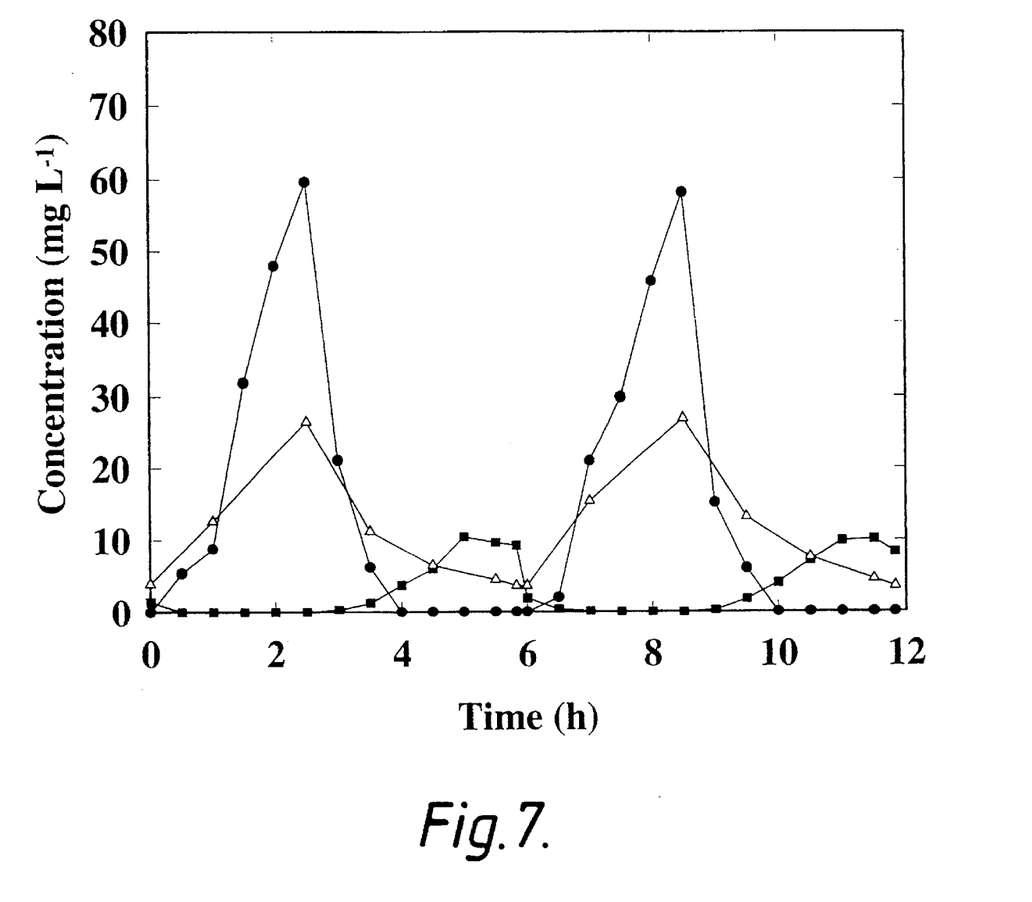
FIG. 7 depicts reactor performance for the IFID system of Example 3 over two cycles at day 95.

After 105 days, the operating conditions were changed slightly, incorporating a 30 minutes non-aerated mixing sequence after one hour of aeration period. This was based on an analysis of the cyclic behavior of the reactor for day 95 as shown in FIG. 7. In this figure, the symbols (●), (■) and (△) indicate the $PO_4$—P, $NO_x$—N and $NH_3$—N concentrations respectively. The introduction of this non-aerated period was to achieve low $NO_x$—N concentration at the end of the SETTLE period. The DO concentration during the aerobic period was controlled to assist simultaneous nitrification/denitrification.

It was observed that $NH_3$—N concentration increased during the FILL period from a minimum of 3.9 mg $L^{-1}$ at the beginning of the cycle to a maximum of 26.6 mg $L^{-1}$ at the end of the FILL period. The increase in ammonia was due to the strength of the influent waste. During the REACT period, ammonia was oxidized to nitrite and nitrate by nitrifiers and simultaneously denitrified by facultative heterotrophs. This was confirmed by the cyclic profile displayed in FIG. 7. The $NO_x$—N concentration, product of the ammonium oxidation, only reaches approximately 40% of the initial ammonium concentration present at the start of the aeration period. From these data it is evident that substantial nitrogen removal by denitrification takes place during the aeration period. Remaining $NO_x$—N at the end of the SETTLE period, was denitrified within the first ½ hour of the non-aerated FILL period. This favors the P removing bacteria to use the incoming substrate and consequently achieve high P release during the FILL period. This can be seen by the soluble $PO_4$—P concentration reaching approximately 60 mg $L^{-1}$ at the end of the FILL. Subsequently, complete P uptake occurred within one and a half hours. The SVI was constantly <100 mg $L^{-1}$ for the period shown in FIG. 6. This enabled fast and efficient separation of the sludge and the supernatant during the SETTLE and DRAW periods. The effluent COD and $NH_3$—N concentrations were between 100–200 mg $L^{-1}$ and 2–5 mg $L^{-1}$, respectively Effluent $PO_4$—P concentrations of <0.5 mg $L^{-1}$ were achieved constantly over a two months period.

The operational results of this example show that combined anaerobic—SBR treatment can be used to treat high nutrient wastewater to achieve very high effluent quality particularly in terms of nutrients. A fast settling, compact sludge was generated in the process which allowed for good separation of the supernatant.

It should be appreciated that various other changes and modifications can be made to the embodiments exemplified without departing from the spirit of the invention which is limited only by the scope of the claims appended hereto.

We claim:

1. A method of operating a sequencing batch reactor having a cycle consisting of FILL, REACT, SETTLE and DRAW periods and optionally an IDLE period, wherein supply of feed to the sequencing batch reactor comprises distributing the feed into settled sludge in the bottom part of the reactor.

2. A method of operating a sequencing batch reactor having a cycle consisting of FILL, REACT, SETTLE and DRAW periods and optionally an IDLE period, wherein supply of feed to the sequencing batch reactor comprises distributing the feed into settled sludge in the bottom part of the reactor and wherein the FILL period includes at least one non-mixed period.

3. A method as recited in claim 2 wherein the FILL period includes one non-mixed period.

4. A method as recited in claim 3 wherein the nonmixed period comprises up to all of the FILL period.

5. A method as recited in claim 4 wherein the FILL period comprises up to about half of the sequence batch reactor cycle.

6. A method as recited in claim 2 wherein the FILL period includes one non-mixed period and a single mixed period.

7. A method as recited in claim 6 wherein the nonmixed period and mixed period comprise about the same portions of the FILL period.

8. A method as recited in claim 7 wherein the FILL period comprises up to about half of the sequence batch reactor cycle.

9. A method of operating a sequencing batch reactor having a cycle consisting of FILL, REACT, SETTLE and DRAW periods and optionally an IDLE period, wherein supply of feed to the sequencing batch reactor comprises distributing the feed into settled sludge in the bottom part of the reactor and wherein the FILL and REACT periods each include at least one non-mixed period.

10. A method as recited in claim 9 wherein the REACT period includes one non-mixed period.

11. A method as recited in claim 10 wherein the non-mixed REACT period comprises up to about half of the sequence batch reactor cycle.

12. A method of operating a sequencing batch reactor, wherein supply of feed to the sequencing batch reactor comprises distributing the feed into settled sludge in the lower part of the reactor and wherein the sequencing batch reactor cycle consists of the following reaction sequence: a non-mixed FILL period; a mixed FILL period; an aerated mixed REACT first period; a non-mixed REACT period; an aerated mixed REACT second period; a SETTLE period; and a DRAW period.

13. A method as recited in claim 12 wherein the sequencing batch reactor cycle further includes an IDLE period.

* * * * *